United States Patent
Kraipak et al.

(10) Patent No.: US 8,868,956 B1
(45) Date of Patent: Oct. 21, 2014

(54) SYSTEM-ON-CHIP WITH FEEDBACK LOOP FOR PROCESSOR FREQUENCY CONTROL

(75) Inventors: Waseem Saify Kraipak, Maharastra (IN); Pradeep Dharane, Maharastra (IN); Yoon Sang Chae, Los Altos, CA (US); Sunil Kumar Singla, Ludhiana (Punjab) (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 881 days.

(21) Appl. No.: 12/639,064

(22) Filed: Dec. 16, 2009

(51) Int. Cl.
  *G06F 1/26* (2006.01)
  *G06F 1/28* (2006.01)
  *G06F 1/30* (2006.01)

(52) U.S. Cl.
  USPC ............... 713/340; 713/300; 714/1; 714/764

(58) Field of Classification Search
  CPC ..... G06F 1/26; G06F 9/5044; G06F 11/1048; G06F 11/2236
  USPC ........................ 713/300, 320, 340; 714/1, 764
  See application file for complete search history.

(56) References Cited

U.S. PATENT DOCUMENTS

| 6,272,318 B1* | 8/2001 | Yoshioka | 340/7.28 |
| 2002/0087896 A1* | 7/2002 | Cline et al. | 713/300 |
| 2008/0080239 A1* | 4/2008 | Shibata | 365/185.03 |
| 2009/0125293 A1* | 5/2009 | Lefurgy et al. | 703/18 |
| 2011/0022871 A1* | 1/2011 | Bouvier et al. | 713/340 |

* cited by examiner

*Primary Examiner* — Michael J Brown
(74) *Attorney, Agent, or Firm* — Amin, Turocy & Watson, LLP

(57) ABSTRACT

A system and method are provided for using feedback to control processor frequencies in a system-on-chip (SoC). The method is associated with an SoC having a processor operating frequency responsive to a processor supply voltage on a first SOC interface, and a controller for managing the operating frequency. The controller accepts a frequency selection command associated with a first operating frequency, at a second SoC interface. The controller sends a first voltage command associated with the first frequency, via a third SOC interface, to a voltage regulator supplying the processor supply voltage. Then, the controller monitors the processor supply voltage. In response to detecting a processor first supply voltage, the processor is enabled to operate at the first frequency.

20 Claims, 6 Drawing Sheets

| Frequency Selection | | | Core Frequency | Voltage Command | Voltage Measurement |
|---|---|---|---|---|---|
| CR2 | CR1 | CR0 | | | |
| 0 | 0 | 0 | 800 MHz | 00000001 | 1.0 V |
| 0 | 0 | 1 | 1.0 GHz | 00000010 | 1.2 V |
| 0 | 1 | 0 | 1.2 GHz | 00000011 | 1.4 V |
| 0 | 1 | 1 | 1.4 GHz | 00000100 | 1.6 V |
| 1 | 0 | 0 | 1.6 GHz | 00000101 | 1.8 V |
| 1 | 0 | 1 | 1.8 GHz | 00000111 | 2.0 V |
| 1 | 1 | 0 | 2.0 GHz | 00001000 | 2.2 V |
| 1 | 1 | 1 | 2.2 GHz | 00001001 | 2.4 V |

Table 128

FIG. 2

SYSTEM-ON-CHIP WITH FEEDBACK LOOP FOR PROCESSOR FREQUENCY CONTROL

BACKGROUND OF THE INVENTION

1. Field of the Invention

This invention generally relates to system-on-chip (SoC) power management and, more particularly, to a feedback system and method for controlling processor operating frequencies in a SoC.

2. Description of the Related Art

It is a well-known fact that a processor can be driven to function at higher operating frequencies by increasing the dc supply voltage. Table 1 describes some exemplary operating frequencies cross-referenced to supply voltages.

TABLE 1

| Frequency | Core Voltage |
|---|---|
| 800 MHz | 1.0 V |
| 1.0 GHz | 1.2 V |
| 1.2 GHz | 1.5 V |
| 1.4 GHz | 1.8 V |
| 1.6 GHz | 2.0 V |
| 1.8 GHz | 2.2 V |

If a user wants to increase the frequency of operation to achieve higher throughput, they may manually intervene to change the dc voltage by changing the resistor/capacitor/conductor ladder dc supply voltage filter, which involves soldering and de-soldering of these components. Alternately, a potentiometer can be supplied, which can rotated by the user to change the core voltage. These methods are cumbersome and subject to user error.

Some conventional processors provide a mechanism for software (SW) to issue speed up or slow down commands to a programmable engine. Usually this mechanism is driven from a central power management SW driver associated with an operating system. Such mechanisms are based purely on the software and operating system view of workload demand. These mechanisms work well for computing applications where the operating system is charged with scheduling the processor resources and has complete control over what is executing when. However, for applications that are dominated by input/output (IO) processing, where the workload is dependent on a set of external events such as packet arrivals and departures, the operating system and associated device drivers do not have enough pre-knowledge of pending load status. Without such pre-knowledge, the processors must be kept in the fully "on" state in order to react to the worst case loading conditions. Further, there is no mechanism to directly track the actual voltage level supplied to the processor, or the actual operating frequency of the processor.

Some existing systems make use of a micro-controller to manage device level power. As an example, the microcontroller may be primarily responsible for sequencing voltage, frequency, and even transistor bias in order to achieve a particular power performance mix. Commands to such a microcontroller are usually driven from a single device driver under an operating system. As described earlier, the commands are based on the software observed workload.

Dynamic voltage and frequency, scaling (DVFS) permits processor frequency and voltage to be dynamically changed based on the software workload requirements. In some systems, DVFS is controlled by a dedicated side band interface between each software controlled processor and a central power management controller (PMC). Each processor typically has a dedicated set of control registers to which it writes change states. If the processor's OS wants a little bit more or less power, it writes to its corresponding control register using a device driver. In a multi core system using asymmetric multiprocessors there is no single unified device driver, but instead, a set of device drivers for each OS. These device drivers are unaware of each other.

In other prior art, a system level microcontroller may be responsible for system level power management. An example might be a notebook computer containing suspend states. The micro controller may be used to sequence the system back to normal operational state in the event of external stimulus such as an arriving wake up packet at an Ethernet port.

The problem with the above-mentioned systems is that none of them insure that the selected dc voltage level is actually delivered to the processor. Attempting to operate a processor at a higher speed than can be supported by the supply voltage can lead to erratic processing results and potentially damage the hardware.

It would be advantageous if a SoC feedback system existed that directly enabled dc supply voltages changes, monitored the actual dc voltages supplied, and only enabled a processor to operate at frequencies supportable by the actual dc supply levels.

SUMMARY OF THE INVENTION

Described herein is a mechanism to directly and dynamically manage system-on-chip (SoC) processor operating frequencies. The mechanism controls changes made to the voltage regulator supplying the dc voltage to the processor. The mechanism disables the processor during power supply changes and monitors the actual dc voltage being supplied by the regulator. The mechanism supplies an operating frequency to the processor capable of being supported by the monitored voltage level, and enables the processor after the dc supply voltage and supplied operating frequency are stabilized.

Accordingly, a method is provided for using feedback to control processor frequencies in a SoC. The method is associated with a SoC having a processor operating frequency responsive to a processor supply voltage on a first SoC interface, and a controller for managing the operating frequency. The controller accepts a frequency selection command associated with a first operating frequency at a second SoC interface. The controller sends a first voltage command associated with the first frequency, via a third SOC interface, to a voltage regulator supplying the processor supply voltage. Then, the controller monitors the processor supply voltage. In response to detecting a processor first supply voltage, the processor is enabled to operate at the first frequency.

In one aspect, monitoring the processor supply voltage includes the substeps of: receiving a digital voltage measurement signal via a fourth SOC interface; and, comparing the voltage measurement signal to a table of voltage measurement signals cross-referenced to voltage commands and operating frequencies. In another aspect, monitoring the processor supply voltage includes the substeps of: converting a processor supply voltage measured at the first SOC interface into the digital voltage measurement signal; and, comparing the voltage measurement signal to a table of voltage measurement signals cross-referenced to voltage commands and operating frequencies.

Additional details of the above-described method, and a SoC with a controller for managing processor operating frequencies, are provided in more detail below.

BRIEF DESCRIPTION OF THE DRAWINGS

FIG. 2 is a diagram of a table of voltage commands cross-referenced to voltage measurement signals and operating frequencies.

DETAILED DESCRIPTION

Figure 1:
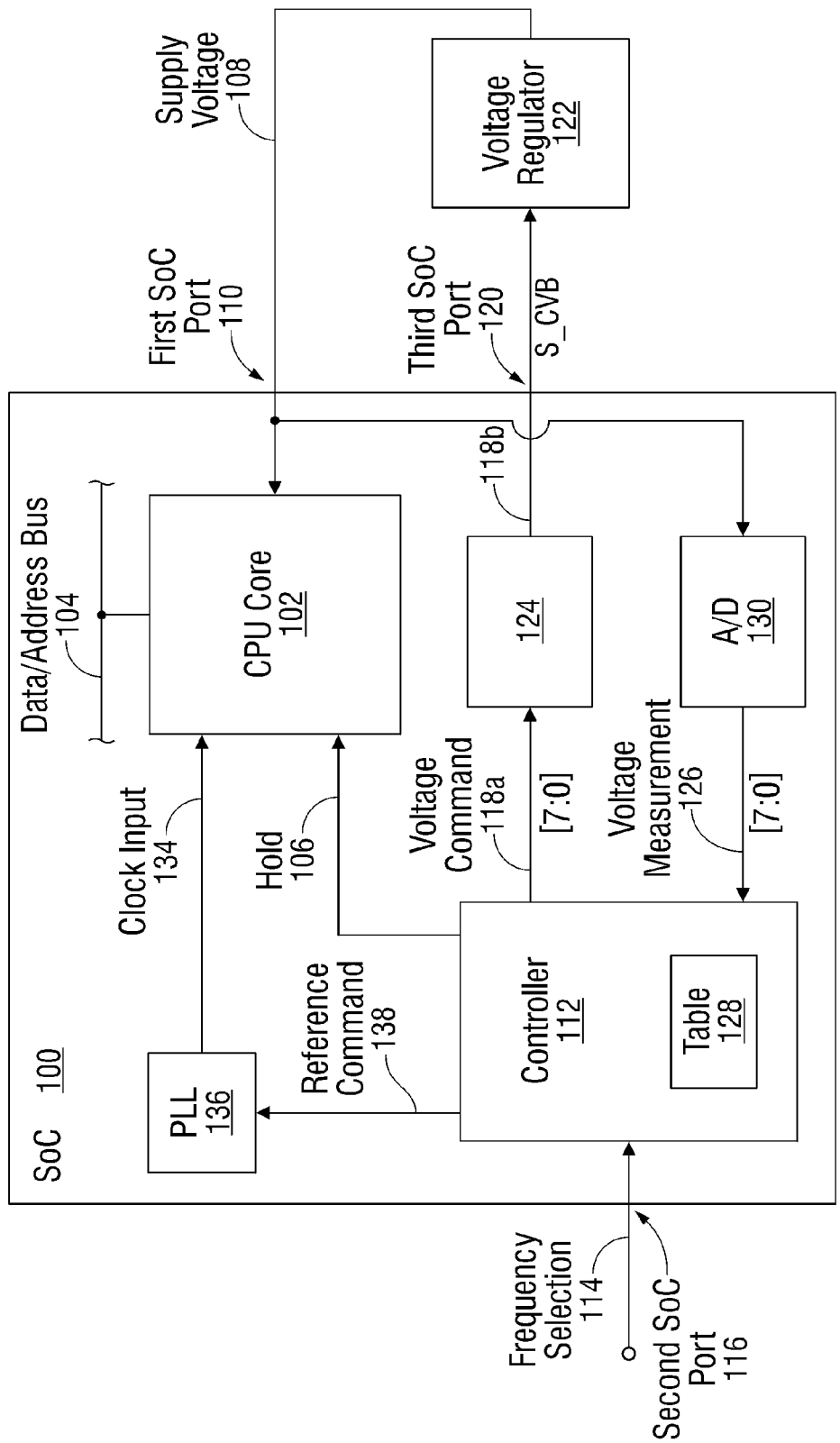
FIG. 1 is a schematic block diagram of a system-on-chip (SOC) with a controller for managing processor operating frequencies.

FIG. 1 is a schematic block diagram of a system-on-chip (SOC) with a controller for managing processor operating frequencies. The SOC 100 comprises a processor 102, which is also referred to herein as a central processing unit (CPU) core, having a data/address bus interface on line 104, a hold interface on line 106, and a supply voltage interface on line 108 to accept a supply voltage via a first SoC port 110. The processor 102 executes instructions received on the data/address bus 104 at an operating frequency responsive to the voltage level on the supply voltage interface on line 108. A controller 112 has a frequency selection interface on line 114 for receiving frequency selection commands via a second SOC port 116. The controller 112 has a voltage command interface on line 118 for sending a digital voltage command via a third SOC port 120 to an external voltage regulator 122 creating the supply voltage on line 108. As shown, a parallel-to-serial converter device 124 may be used to convert a parallel digital voltage command (e.g., 8 bits) on line 118a to a serial voltage command on line 118b. Alternately but not shown, the controller may originate the serial voltage command. As another alternative, the voltage command may be sent as a parallel command (see FIG. 3), or sent via a wireless SOC interface (not shown).

The controller 112 also has a voltage monitoring interface on line 126 for accepting a digital voltage measurement signal associated with the supply voltage, and a hold interface on line 106 to supply an enable signal to the processor hold interface. The enable signal is supplied when the voltage level associated with the voltage command matches the voltage level associated with the voltage measurement signal.

FIG. 2 is a diagram of a table of voltage commands cross-referenced to voltage measurement signals, operating frequencies, and frequency selection commands. The table may be enabled in a tangible controller memory or in an external memory accessible to the controller. Note: there are a number of means for the controller to check the validity of the supply voltage on line 108 to the voltage command sent on line 118.

Returning to FIG. 1, an analog-to-digital converter (A/D) 130 has an input connected to the first SOC port 110 to receive the supply voltage, and an output on line 126 to supply the voltage measurement signal. The controller 112 receives the voltage measurement signal from the A/D 130, accesses the table 128, and sends the enable signal on line 106 in response to matching the received voltage measurement signal to the voltage command.

Figure 3:
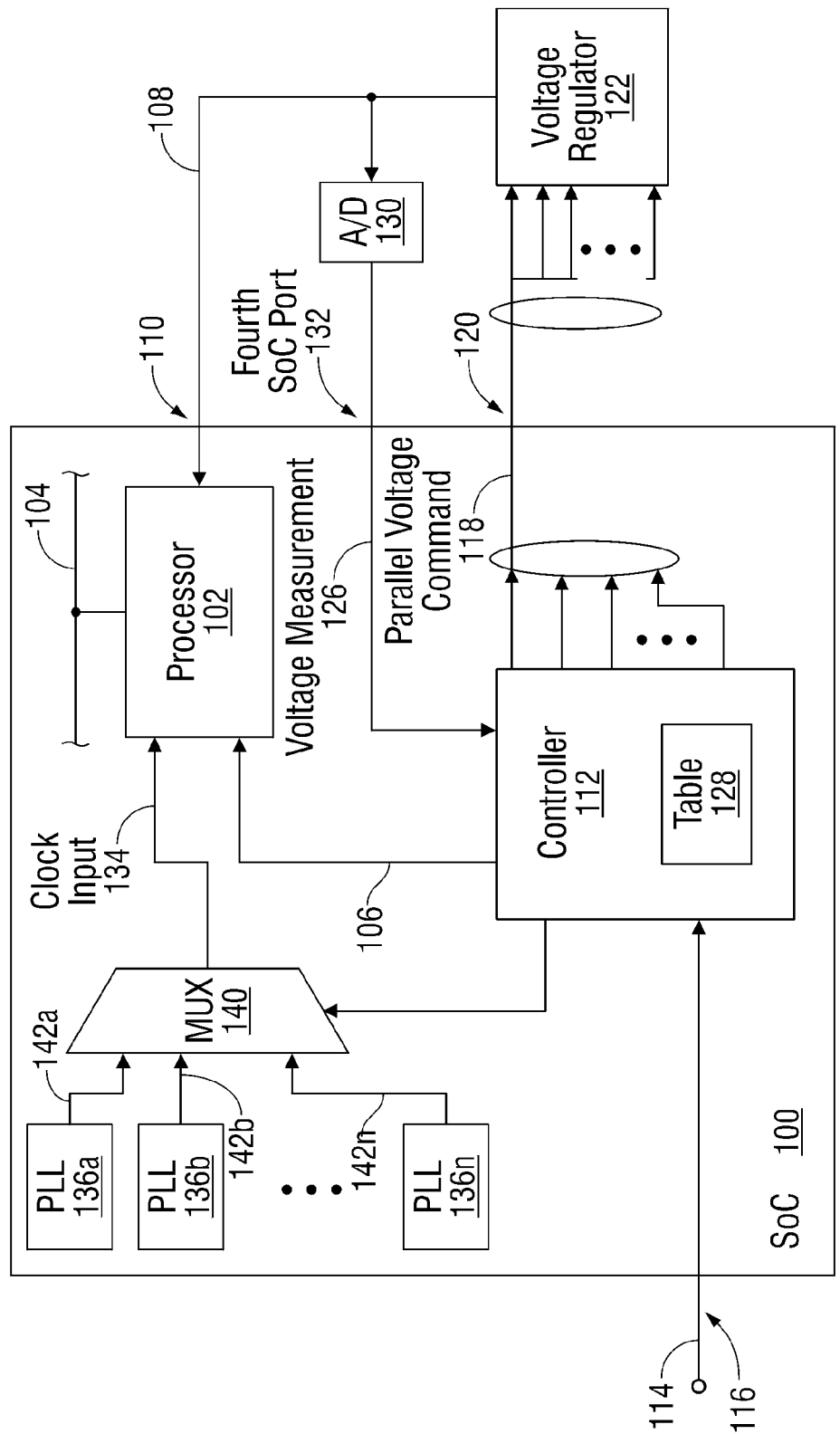
FIG. 3 is a schematic block diagram depicting a variation of the SoC of FIG. 1.

FIG. 3 is a schematic block diagram depicting a variation of the SoC of FIG. 1. In this aspect, the A/D 130 is located external to the SoC 100. The controller 112 receives the voltage measurement signal from the A/D 130 via a fourth SOC port 132, accesses the table 128, and sends the enable signal on line 106 in response to matching the received voltage measurement signal to the voltage command.

Referencing either FIG. 1 or 3, in one aspect the controller 112 initially sends a disable signal to the processor hold interface on line 106 in response to receiving a frequency selection command on line 114. The controller 112 maintains the disable signal until the enable signal is sent.

In another aspect, the processor includes a clock (CLK) input interface on line 134 for receiving a selected clock signal having the operating frequency. As shown in FIG. 1, a phase-locked loop (PLL) 136 has an input on line 138 to accept a reference command and an output connected to the processor clock input interface on line 134. The PLL 136 is capable of generating one of a plurality of clock signals in response to the reference command on line 138. For example, a first clock signal having the first frequency (e.g., 1200 MHz) and a second clock signal having the second frequency (e.g., 1000 MHz) may be generated. The controller 112 has an output on line 138 to supply the reference command in response to the frequency select command received on line 114.

For example, the controller 112 may receive a frequency selection command on line 114 associated with a first operating frequency, and select a first clock signal having the first frequency—if the voltage measurement signal on line 126 matches the voltage command sent on line 118. However, the controller 112 may select a previously supplied second clock signal with a second frequency, if the voltage measurement signal fails to match the voltage command. This would be the case if the voltage supplied on line 108 is insufficiently high to support desired processor operating frequency.

Alternately as shown in FIG. 3, the SoC may comprise a plurality of PLLs, 136a through 136n, where n is a variable not limited to any particular value. Each PLL 136 generates a clock signal, including a first PLL 136a generating a first clock signal having the first frequency and a second PLL 136b generating a second clock signal having the second frequency. A multiplexer (MUX) 140 has a plurality of signal inputs to accept the corresponding plurality of clock signals on lines 142a through 142n, and a control input on line 138 to accept the reference command. The MUX 140 has an output on line 134 to supply a clock signal to the processor clock input interface in response to reference command on line 138. As noted above, the controller has an output on line 138 to supply the reference command in response to the frequency select command received on line 114. Note: although not shown, the SoC of FIG. 1 may be enabled with a plurality of PLLs, as shown in FIG. 3. Alternately, the SoC of FIG. 3 may be enabled using a single PLL capable of generating a plurality of clock frequencies, as shown in FIG. 1

Referencing either FIG. 1 or 3, the controller 112 typically supplies the reference command on line 118 selecting a clock (a clock frequency), prior to sending the enable signal to the processor hold interface on line 106. The clock is enabled several cycles before the processor is reenabled, so that all the registers inside the processor (not shown) that are receiving clock, setup, and hold times are stable. Otherwise, there is the risk of metastability and the processor may hang up.

As used in this application, the terms "component," "module," "system," and the like may refer to an automated computing system entity, such as hardware, firmware, a combination of hardware and software, software, software stored on a computer-readable medium, or software in execution. For example, elements of the controller may be, but are not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Since the process of using a processor to execute software instructions stored in a tangible memory is well known in the art, these details are not explicitly shown in the drawings. Alternately, the controller may be completely enabled in hardware.

Functional Description

The systems described above in the explanation of FIGS. 1 and 3 solve many of the problems associated with controlling the operating frequency of a processor. A communication channel called the voltage change bus (VCB) or voltage command signal, between the SoC and a voltage regulator is used to achieve the desired voltage levels in a controlled and efficient manner. There are several advantages associated with such a system.

A Throughput Burst Mode can be enabled, which is useful in increasing performance for certain applications such as gaming. In a User Mode, a GUI interface (on line 114) can be used to set a desired frequency. Alternately, an application layer can monitor the processor workload and depending on that workload, this application can automatically change the frequency through signals on line 114.

In a Power Saving Mode an application may command the core to run more slowly by decreasing the frequency as well as the operating voltage of the core, thus saving power. Again a GUI interface (on line 114) can be used set a desired frequency. Alternately, an application layer can monitor the processor workload and depending on that workload, this application can automatically change the frequency through signals on line 114.

In a Performance Monitoring Mode, hardware in the SoC can monitor if the core is idle and put the core into the Power Saving Mode. In a Thermal Management Mode, a thermal management unit inside the SOC (not shown) can detect the CPU die temperature as well as the SoC ambient temperature and instruct the core to reduce the frequency, so that the core can be cooled.

Figure 4:
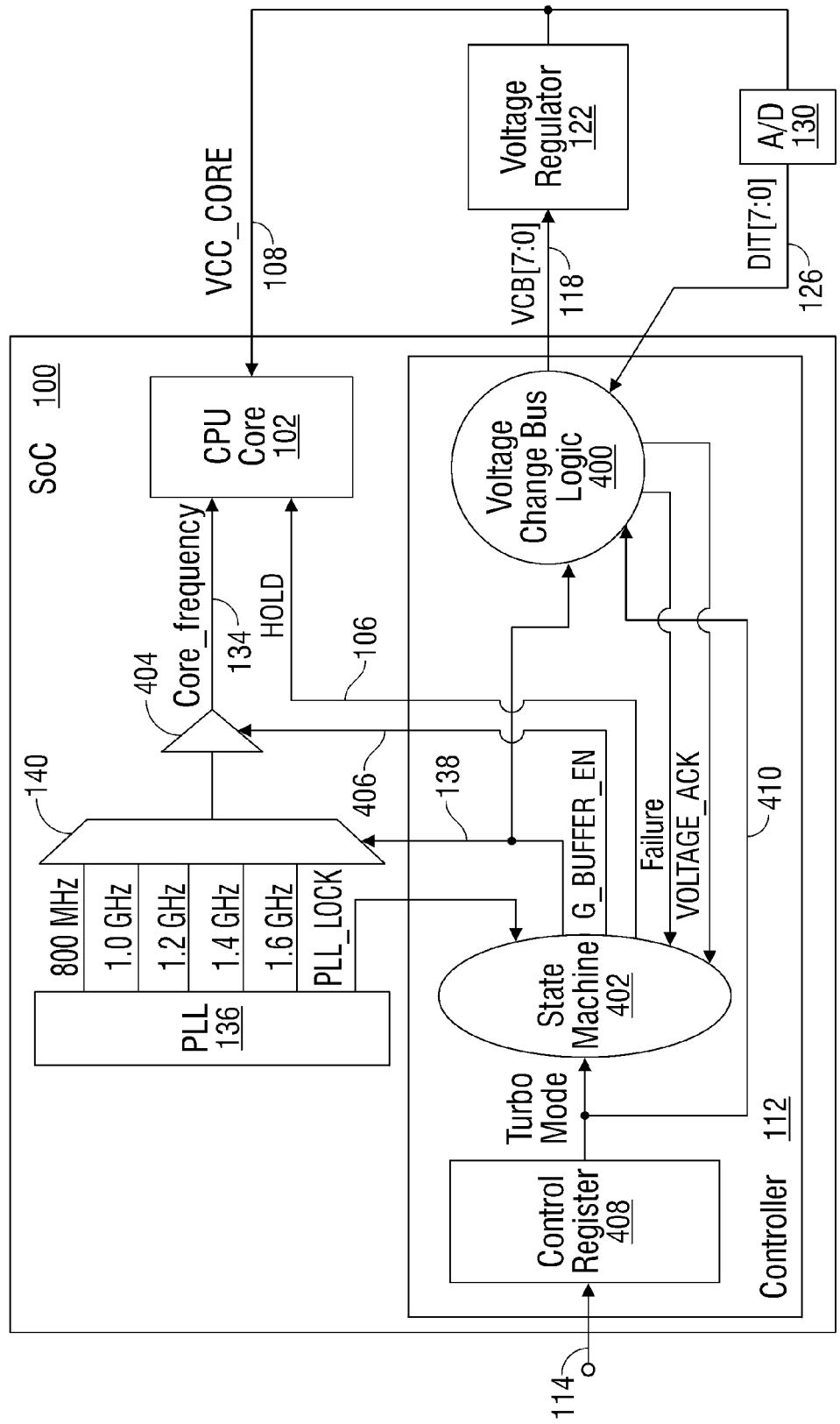
FIG. 4 is a schematic block diagram combining aspects of FIGS. 1 and 3, and depicting additional controller details.

FIG. 4 is a schematic block diagram combining aspects of FIGS. 1 and 3, and depicting additional controller details. As shown, the controller includes the elements of a voltage change bus logic module 400 which is responsible for sending the voltage command on line 118 and receiving the voltage measurement on line 126. In response to comparing the voltage command and measurement, either a "failure" or a "VOLTAGE ACK" is delivered to the state machine 402. In this aspect, the SoC 100 includes a clock buffer 404 which is enabled in response to a G_BUFFER_EN command on line 406.

For the purpose of illustration, the table of FIG. 2 depicts frequency bands between 800 MHz and 2.2 GHz, with a step size of 200 MHz. There are 3 bits in the control register 408 (see FIG. 4). These bits are CR2, CR1, and CR0. These bits are associated with the frequency selection command on line 114 and can be set by the user to a desired core frequency. To proceed with the example, a user wants to start a Gaming/Video Application for which they need the core to run at a higher frequency. This example supports the Throughput Boost Mode (GUI based) explained above. The target core frequency is 1.0 GHz.

Figure 5:
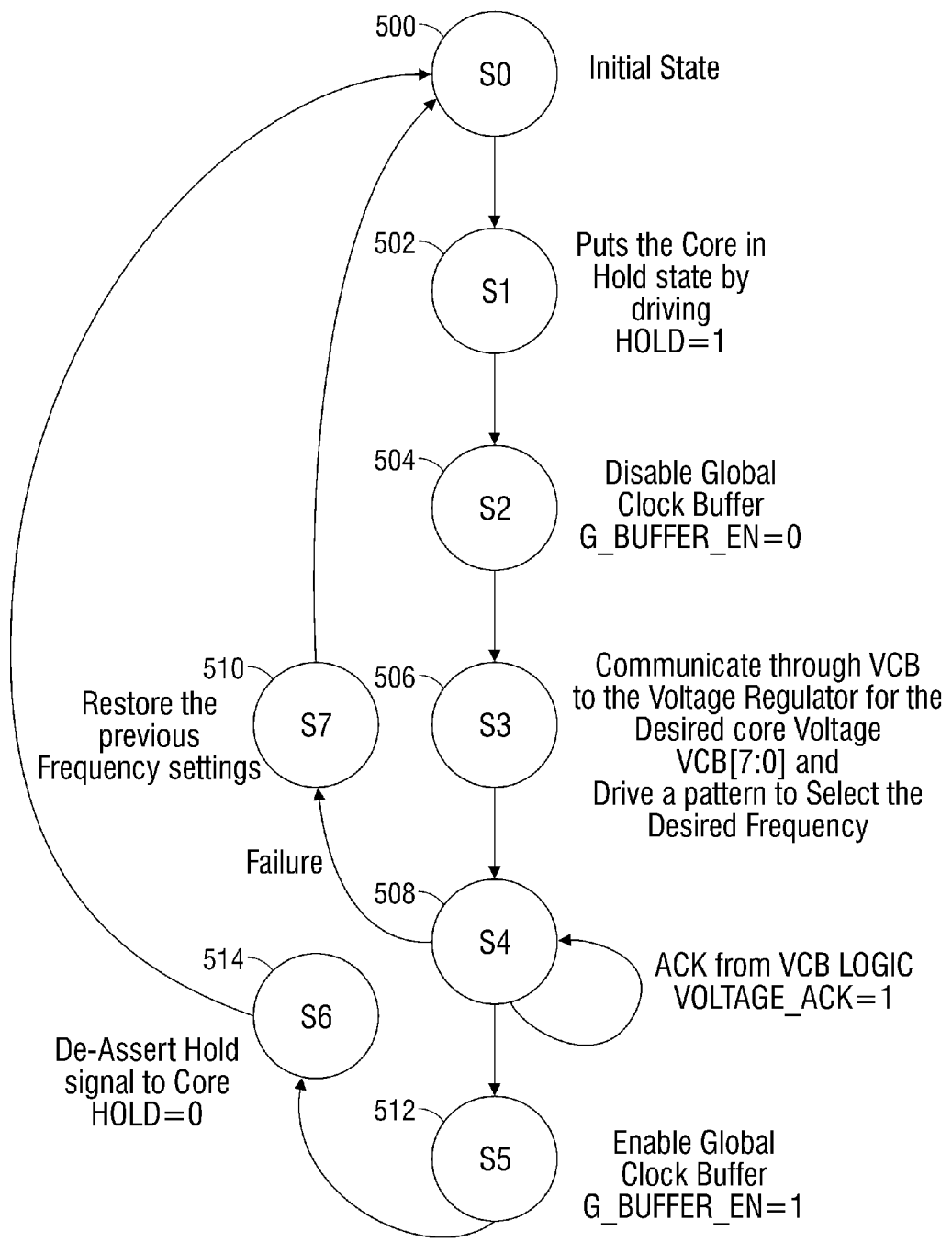
FIG. 5 is a state machine diagram depicting an exemplary frequency change operation.

FIG. 5 is a state machine diagram depicting an exemplary frequency change operation. Contrasting FIGS. 2, 4, and 5, in Step 500 (S0), the user sets the Control Register bits (CR2, CR1, CR0)=001 in the initial state. This operation may be performed through a software application to program this control register using commands on line 114. Upon setting the above register values in Step 500, a pulse (TURBO_MODE) is generated on line 410 that triggers the state machine 402. In Step 502 (S1), the core is put into a hold state by asserting the signal HOLD=1. In Step 504 (S2), the control logic sends a signal to disable the global clock buffer 404 by asserting the signal G_BUFFER_EN=0 on line 406. This action is to disable the current core frequency.

In Step 506 (S3), the state machine communicates to the voltage control bus logic module 400 to send an 8-bit VCB pattern to the voltage regulator 122, for creating the voltage corresponding to the 1 GHz core frequency. Also, a pattern is driven on reference command signal on line 138 to select the desired frequency.

In Step 508 (S4), the voltage control bus logic module 400 monitors the A/D output [7:0] on line 126 to check whether the voltage regulator has reached the desired voltage. Upon reaching the desired voltage, an acknowledgement (VOLTAGE_ACK) is sent to the state machine 402 stating that the desired voltage level has been reached. In case the voltage regulator is not able to adjust its output voltage to the desired voltage, the voltage control bus logic module 400 informs the state machine 402 by asserting Failure signal=1, and the state machine goes to Step 510 (S7), where the previous frequency settings are restored, and then proceeds to Step 500 (S0).

In Step 512 (S5), the state machine enables the global clock buffer 404 by setting the G_BUFFER_EN=1. In Step 514 (S6), the state machine 402 enables the core by de-asserting the signal HOLD=0 and the state machines moves to Step 500 (S0).

Figure 6:
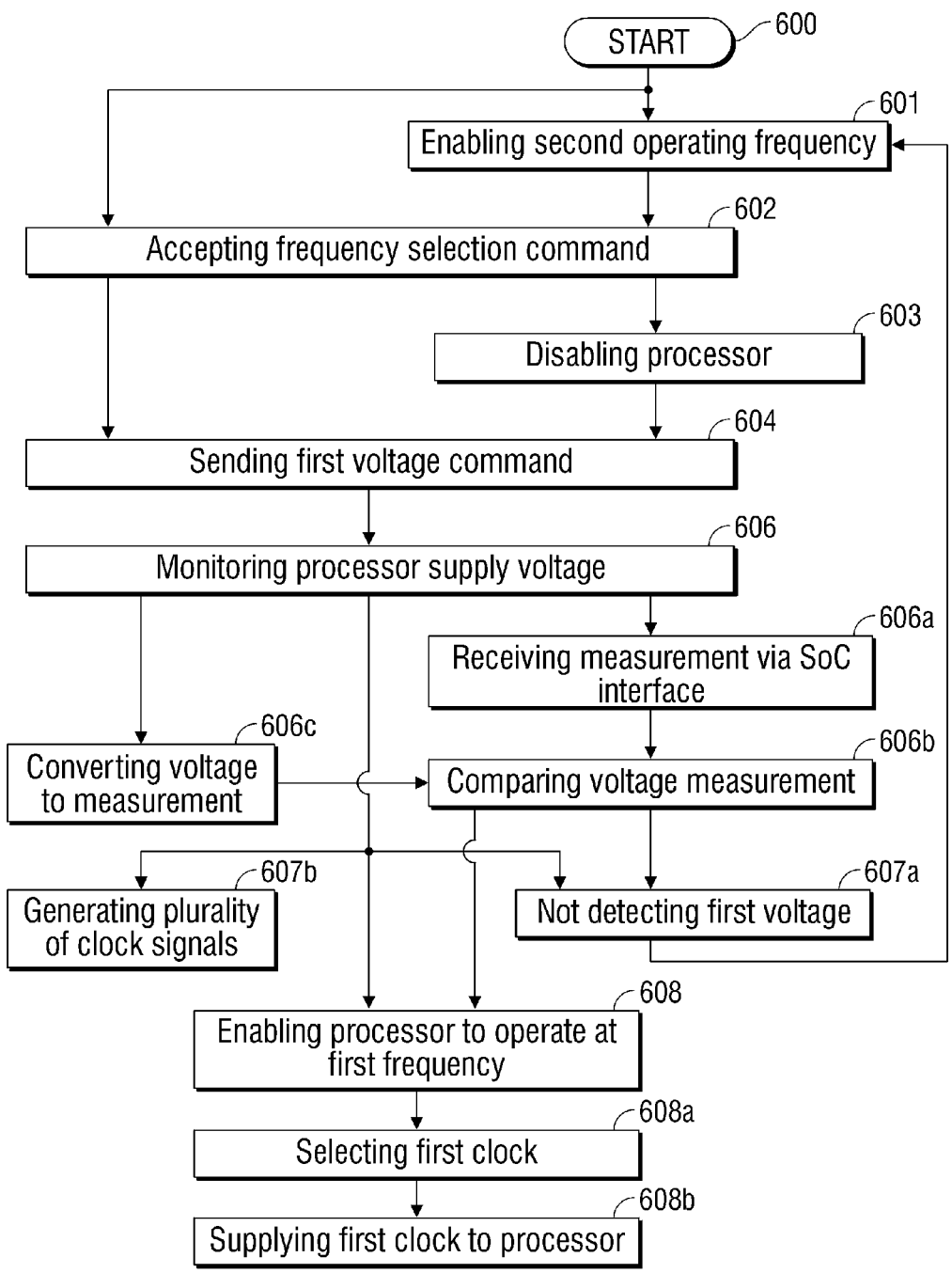
FIG. 6 is a flowchart illustrating a method for using feedback to control processor frequencies in a SoC.

FIG. 6 is a flowchart illustrating a method for using feedback to control processor frequencies in a SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

In the context of a SoC with a processor operating frequency responsive to a processor supply voltage on a first SOC interface, and a controller for managing the operating frequency, in Step 602 the controller accepts a frequency selection command associated with a first operating frequency, at a second SoC interface. In Step 604 the controller sends a first voltage command associated with the first frequency, via a third SOC interface, to a voltage regulator supplying the processor supply voltage. The first voltage command can be sent via a serial, parallel, or wireless SOC interface. In Step 606 the controller monitors the processor supply voltage. In response to detecting a processor first supply voltage, Step 608 enables the processor to operate at the first frequency.

In one aspect, monitoring the processor supply voltage in Step 606 includes substeps. Step 606a receives a digital voltage measurement signal via a fourth SOC interface. Step 606b compares the voltage measurement signal to a table of voltage measurement signals cross-referenced to voltage commands and operating frequencies. In an alternate aspect, Step 606c converts a processor supply voltage measured at the first SOC interface into the digital voltage measurement signal, and Step 606b compares the voltage measurement signal to a table of voltage measurement signals cross-referenced to voltage commands and operating frequencies.

In one aspect, subsequent to receiving the frequency selection command in Step 602, the controller initially disables the processor from operating in Step 603. Then, enabling the processor to operate at the first frequency in Step 608 includes sending an enable signal to the processor in response to detecting a processor supply first voltage.

In a different aspect, prior to receiving the frequency selection command in Step 602, Step 601 enables the processor to operate at a second operating frequency. Then, subsequent to receiving the frequency selection command in Step 602, if the processor first supply voltage is not detected in Step 607a, the processor is (re)enabled to operate at the second operating frequency (Step 601).

Typically, enabling the processor to operate at the first frequency in Step 608 includes substeps. Step 608a selects the first clock signal, and Step 608b supplies the first clock signal to a processor clock input interface. In one aspect, Step 607b generates a plurality of clock signals, including a first clock signal having the first frequency. Alternately, only a signal clock signal is generated, and that signal is not generated until the clock frequency is selected (Step 602). Either way, Step 608 typically supplies the first clock signal prior to sending the enable signal to the processor.

A system and method have been provided for using feedback to control processor frequencies in a SoC. Examples of particular message structures, processors, and hardware units have been presented to illustrate the invention. However, the invention is not limited to merely these examples. Other variations and embodiments of the invention will occur to those skilled in the art.

We claim:

1. A method for controlling processor frequencies in a system-on-chip (SoC), comprising:
   accepting a frequency selection command associated with a first frequency;
   sending a first voltage command associated with the first frequency to a voltage regulator that supplies a processor supply voltage to a processor;
   monitoring the processor supply voltage; and,
   enabling the processor to operate at the first frequency in response to a determination based on a table of voltage measurements cross-referenced to voltage commands that a digital voltage measurement signal associated with the processor supply voltage generated by the voltage regulator corresponds to a voltage level associated with the first voltage command.

2. The method of claim 1 wherein monitoring the processor supply voltage comprises:
   receiving the digital voltage measurement signal; and,
   comparing the digital voltage measurement signal to the table of the voltage measurements cross-referenced to the voltage commands.

3. The method of claim 1 wherein monitoring the processor supply voltage comprises:
   converting the processor supply voltage generated by the voltage regulator into the digital voltage measurement signal; and,
   comparing the digital voltage measurement signal to the table of the voltage measurements cross-referenced to the voltage commands.

4. The method of claim 1 further comprising:
   disabling the processor from operating subsequent to receiving the frequency selection command; and,
   wherein enabling the processor to operate at the first frequency comprises sending an enable signal to the processor in response to detecting the processor first supply voltage that corresponds to the voltage level associated with the first voltage command.

5. The method of claim 4 further comprising:
   generating a plurality of clock signals, comprising a first clock signal having the first frequency; and,
   wherein enabling the processor to operate at the first frequency comprises:
      selecting the first clock signal; and,
      supplying the first clock signal to a processor clock input interface.

6. The method of claim 4 wherein supplying the first clock signal comprises supplying the first clock signal prior to sending the enable signal to the processor.

7. The method of claim 4 wherein enabling the processor to operate at the first frequency comprises:
   selectively generating the first clock signal; and,
   supplying the first clock signal to a processor clock input interface.

8. The method of claim 1 further comprising:
   enabling the processor to operate at a second frequency prior to receiving the frequency selection command;
   enabling the processor to operate at the second frequency subsequent to receiving the frequency selection command, if the processor first supply voltage is not detected.

9. The method of claim 1 wherein sending the first voltage command comprises sending the first voltage command via an interface comprising a serial, parallel, or wireless SOC interface.

10. A system-on-chip (SOC) comprising:
    a processor having a supply voltage interface to accept a supply voltage; and,
    a controller having a frequency selection interface for receiving a frequency selection command, a voltage command interface for sending a digital voltage command to an external voltage regulator generating the supply voltage, a voltage monitoring interface for accepting a digital voltage measurement signal associated with the supply voltage, and a hold interface that supplies an enable signal to the processor to enable the processor to operate at a first frequency associated with the frequency selection command in response to a determination based on a table of voltage measurement signals cross-referenced to voltage commands that a first voltage level associated with the digital voltage command matches a second voltage level associated with the digital voltage measurement signal that corresponds to the supply voltage generated by the external voltage regulator.

11. The SOC of claim 10 wherein the controller comprises the table in tangible memory; and,
    the controller receives the digital voltage measurement signal, accesses the table, and sends the enable signal in response to matching the digital voltage measurement signal to the digital voltage command.

12. The SOC of claim 10 further comprising:
    an analog-to-digital converter (A/D) having an input connected to the supply voltage interface configured to receive the supply voltage, and an output to supply the digital voltage measurement signal;

wherein the controller comprises the table in tangible memory; and, the controller receives the digital voltage measurement signal from the A/D, accesses the table, and sends the enable signal in response to the determination that the first voltage level associated with the digital voltage command matches the second voltage level associated with the digital voltage measurement signal that corresponds to the supply voltage generated by the external voltage regulator.

13. The SOC of claim 10 wherein the controller initially sends a disable signal to the processor in response to receiving a frequency selection command, and maintains the disable signal until the enable signal is sent.

14. The SOC of claim 13 wherein the processor comprises clock input interface for receiving a selected clock signal having the first frequency;

wherein the controller receives the frequency selection command associated with the first frequency, selects a first clock signal having the first frequency if the digital voltage measurement signal matches the voltage command, and selects a previously supplied second clock signal with a second frequency if the digital voltage measurement signal fails to match the voltage command.

15. The SoC of claim 14 further comprising:

a plurality of phase-locked loops (PLLs), each generating a clock signal, comprising a first PLL generating a first clock signal having the first frequency and a second PLL generating a second clock signal having the second frequency;

a multiplexer (MUX) having a plurality of signal inputs to accept the corresponding plurality of clock signals, a control input to accepts a reference command, and an output to supply a clock signal to the processor clock input interface in response to the reference command; and, wherein the controller has an output to supply the reference command in response to the frequency select command.

16. The SoC of claim 14 wherein the controller supplies the reference command selecting the first clock, prior to sending the enable signal to the processor.

17. The SoC of claim 14 further comprising:

a PLL having an input to accept a reference command and an output connected to the processor clock input interface, the PLL capable of generating one of a plurality of clock signals in response to the reference command, comprising a first clock signal having the first frequency and a second clock signal having the second frequency; and, wherein the controller has an output to supply the reference command in response to the frequency select command.

18. The SoC of claim 10 wherein the controller sends the first voltage command via a SOC interface comprising a serial, a parallel, or a wireless SOC interface.

19. A system-on-chip (SOC) comprising:

a processor having a supply voltage interface to accept a supply voltage; and, a controller having a frequency selection interface for receiving a frequency selection command, a voltage command interface for sending a digital voltage command to an external voltage regulator generating the supply voltage, a voltage monitoring interface for accepting a digital voltage measurement signal associated with the supply voltage, and a hold interface that supplies an enable signal to the processor to enable the processor to operate at a first frequency associated with the frequency selection command in response to a determination based on a table of voltage measurements cross-referenced to digital voltage commands that a first voltage level associated with the digital voltage command matches a second voltage level associated with the digital voltage measurement signal that corresponds to the supply voltage generated by the external voltage regulator, the controller comprising the table in tangible memory, and, the controller configured for receiving the digital voltage measurement signal, for accessing the table, and for sending the enable signal in response to matching the digital voltage measurement signal to the digital voltage command.

20. The SOC of claim 19, wherein the controller is configured for initially sending a disable signal to the processor in response to receiving a frequency selection command, and for maintaining the disable signal until the enable signal is sent.

* * * * *